US012782716B2

(12) United States Patent
Kojima

(10) Patent No.: US 12,782,716 B2
(45) Date of Patent: Nov. 3, 2026

(54) IMAGE FORMING APPARATUS

(71) Applicant: Toshiba Tec Kabushiki Kaisha, Tokyo (JP)

(72) Inventor: Takahiro Kojima, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 18/583,760

(22) Filed: Feb. 21, 2024

(65) Prior Publication Data

US 2024/0402629 A1 Dec. 5, 2024

(30) Foreign Application Priority Data

May 31, 2023 (JP) ................................ 2023-089821

(51) Int. Cl.
*G03G 15/043* (2006.01)
*B41J 2/47* (2006.01)
(Continued)

(52) U.S. Cl.
CPC ........... *G02B 26/122* (2013.01); *B41J 2/471* (2013.01); *G02B 26/0816* (2013.01);
(Continued)

(58) Field of Classification Search
CPC ............. G03G 15/043; G03G 15/0435; G02B 26/08; G02B 26/0816; G02B 26/12;
(Continued)

(56) References Cited

U.S. PATENT DOCUMENTS

| | | | | |
|---|---|---|---|---|
| 5,445,017 A | | 8/1995 | Mizuno | |
| 6,459,443 B1 * | | 10/2002 | Klement ........... | G06K 15/1204 347/261 |

(Continued)

FOREIGN PATENT DOCUMENTS

| | | |
|---|---|---|
| JP | H09-49974 A | 2/1997 |
| JP | H09-149202 A | 6/1997 |
| JP | 2005-059449 A | 3/2005 |
| JP | 2014-071338 A | 4/2014 |

OTHER PUBLICATIONS

EP Search Report for EP Application No. 24159049, dated Aug. 8, 2024, pp. 1-8.
Notice of Reasons for Refusal dated Feb. 3, 2026 issued in JP Application No. 2023-089821, with English translation, 8 pages.

*Primary Examiner* — Douglas X Rodriguez
*Assistant Examiner* — Kendrick X Liu
(74) *Attorney, Agent, or Firm* — FOLEY & LARDNER LLP

(57) ABSTRACT

An image forming apparatus includes a polygon mirror configured to deflect a laser beam toward a photoconductor and a polygon mirror motor configured to rotate the polygon mirror. A controller acquires a measurement of a spin up time taken for a rotation speed of the polygon mirror motor to reach a target rotation speed range. The controller determines whether the spin up time is between (a) a first threshold time predefined based on a period of time required for the rotation speed of the polygon mirror motor to reach the target rotation speed range and (b) a second threshold time predefined as a period of time indicating that the polygon mirror motor is broken. The controller stores history data regarding the spin up time in response to a determination that the spin up time is between the first threshold time and the second threshold time.

14 Claims, 9 Drawing Sheets

(51) Int. Cl.
*G02B 26/08* (2006.01)
*G02B 26/12* (2006.01)
*H04N 1/00* (2006.01)

(52) U.S. Cl.
CPC ......... *G02B 26/127* (2013.01); *G02B 26/129* (2013.01); *G03G 15/0435* (2013.01); *H04N 1/00034* (2013.01); *H04N 1/00037* (2013.01); *H04N 1/00042* (2013.01); *H04N 1/00079* (2013.01); *H04N 1/0009* (2013.01)

(58) Field of Classification Search
CPC ................ G02B 26/121; G02B 26/122; G02B 26/127; G02B 26/129; B41J 2/47; B41J 2/471; H04N 1/00026; H04N 1/00034; H04N 1/00037; H04N 1/00042; H04N 1/0005; H04N 1/00071; H04N 1/00074; H04N 1/0009
See application file for complete search history.

(56) References Cited

U.S. PATENT DOCUMENTS

| | | | | |
|---|---|---|---|---|
| 2006/0098216 | A1* | 5/2006 | Sugimoto .......... | G06K 15/1204 358/1.5 |
| 2009/0251755 | A1* | 10/2009 | Oda ..................... | G03G 15/043 359/216.1 |
| 2016/0349659 | A1* | 12/2016 | Shoji .................. | G03G 15/0409 |
| 2019/0079437 | A1 | 3/2019 | Motoyama | |
| 2022/0276599 | A1* | 9/2022 | Tanaka ............. | G03G 15/04036 |

* cited by examiner

IMAGE FORMING APPARATUS

CROSS-REFERENCE TO RELATED APPLICATION

This application is based upon and claims the benefit of priority from Japanese Patent Application No. 2023-089821, filed on May 31, 2023, the entire contents of which are incorporated herein by reference.

FIELD

Embodiments described herein relate generally to an image forming apparatus.

BACKGROUND

An image forming apparatus disposed in a workplace includes a printer that forms a visible image corresponding to image data on paper. As the image forming apparatus, a digital multi-functional peripheral (MFP) including not only the printer but also a scanner that acquires a text, an illustration, or a photograph on an object to be read based on brightness and darkness of light and generates image data corresponding to the brightness and darkness is widely used. As the printer of the image forming apparatus, an electrophotographic printer is widely used. The electrophotographic printer includes an exposure unit that includes light sources of a plurality of laser beams and an optical system such as a polygon mirror. The exposure unit forms a latent image on a photoconductive drum by irradiating the photoconductive drum with a laser beam controlled according to the image data. The image forming apparatus obtains a visible image by visualizing the latent image with a visualizing agent (e.g., a developer). The image forming apparatus temporarily moves the visible image to a transfer belt, and further moves the visible image moved to the transfer belt to paper. The image forming apparatus fixes the visible image moved to the paper to the paper using a fixing unit.

Power from an external apparatus, an ON signal, a clock signal transmitted from an internal or external device for rotation speed control, and the like are supplied to a polygon mirror motor that drives and rotates the polygon mirror of the exposure unit. When the ON signal is input, the polygon mirror motor starts to rotate and increases the rotation speed. When a rotation speed corresponding to a clock is reached, the polygon mirror motor enters a steady rotation state and outputs a rotation synchronization signal.

In the related art, for abnormality detection of the polygon mirror motor, detection of the rotation synchronization signal output from the polygon mirror motor on the image forming apparatus main body side starts from the start of the rotation of the motor. When the synchronization signal is not obtained within a preset period of time, abnormality of the motor is determined on the image forming apparatus side, and the abnormality is displayed on a display unit of an operation panel in the image forming apparatus, and an operation of the image forming apparatus main body is stopped. Until a repair such as polygon mirror motor replacement is completed, the image forming apparatus cannot be used.

DETAILED DESCRIPTION

Embodiments provide an image forming apparatus capable of predicting failure prior to a complete breakdown of a polygon mirror motor.

In general, according to one embodiment, provided is an image forming apparatus where a polygon mirror that is rotated by a polygon mirror motor deflects a laser beam to a photoconductor to form an image, the apparatus including acquisition means, determination means, and storage means. The acquisition means acquires a first period of time taken until a rotation speed of the polygon mirror motor reaches a target rotation speed range. The determination means determines whether the first period of time is between a second period of time and a third period of time, the second period of time being predefined as a period of time in which the rotation speed of the polygon mirror motor is in the target rotation speed range, and the third period of time being predefined as a period of time required to determine that the polygon mirror motor is broken. The storage means stores history data regarding the first period of time when the first period of time is between the second period of time and the third period of time.

Hereinafter, an image forming apparatus according to an embodiment will be described with reference to the drawings. In each of the drawings used for the description of the embodiment, the scale of each of components is appropriately changed. In each of the drawings used for describing the following embodiment, configurations are omitted appropriately for convenience of description.

Figure 1:
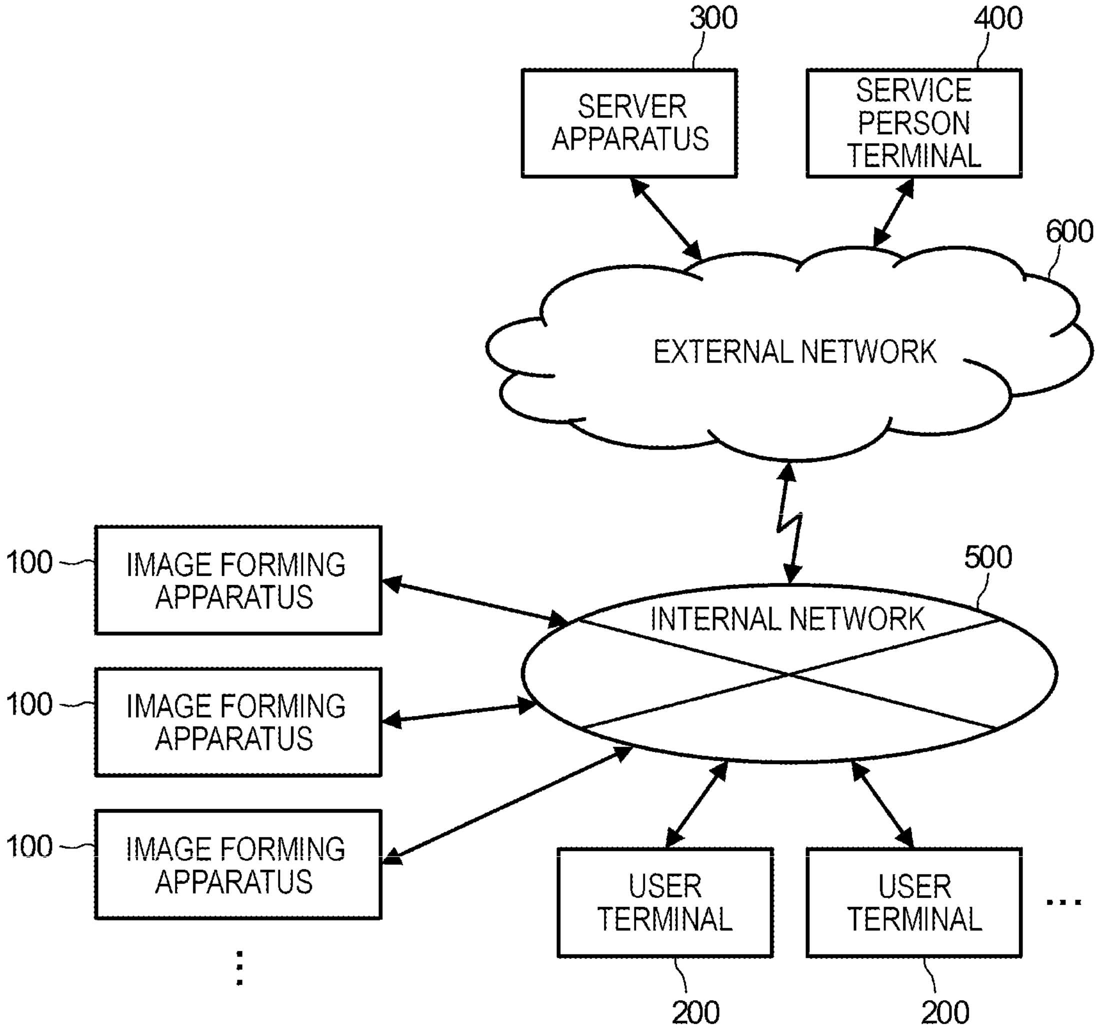
FIG. 1 is a diagram illustrating a schematic configuration of a printing system including an image forming apparatus according to an embodiment.

FIG. 1 is a diagram illustrating a schematic configuration of a printing system including a plurality of image forming apparatuses 100 according to the embodiment. The printing system further includes a plurality of user terminals 200 (e.g., user devices, user interfaces, etc.), a server apparatus 300 (e.g., a server), and a service person terminal 400 (e.g., a service person terminal, a user device, a user interface, etc.). Each of the image forming apparatuses 100 is disposed in a workplace and can be communicatively connected to the user terminal 200 disposed in the same workplace via an internal network 500 such as a local area network (LAN). The connection may be wired connection or wireless connection. The internal network 500 is connected to an external network 600 such as the Internet. The server apparatus 300 and the service person terminal 400 are connected to the external network 600. As a result, the image forming apparatus 100 can be communicatively connected to the server apparatus 300 via the internal network 500 and the external network 600.

The user terminal 200 is an information processing apparatus such as a personal computer (PC), a smartphone, a tablet terminal, or a digital camera that instructs printing in any of the image forming apparatuses 100. The user terminal 200 may be communicatively connected to the image forming apparatus 100 via the external network 600 and the internal network 500. That is, the user terminal 200 may be disposed outside the workplace where the image forming apparatus 100 is disposed. The user terminal 200 may be connected directly to the image forming apparatus 100 without passing through the external network 600 and the internal network 500, that is, may be locally connected to the image forming apparatus 100. The local connection may be wired connection or wireless connection.

The server apparatus 300 is a computer apparatus operated directly by a management company that contracts for maintenance and inspection of the image forming apparatus 100 or operated by an outsourcing service provider. The server apparatus 300 regularly or optionally acquires data representing an operating status of each of the image forming apparatuses 100 or acquires notification data such as an alert transmitted from the image forming apparatus 100. The server apparatus 300 determines necessity of an inspection or a repair of each of the image forming apparatuses 100 based on the acquired data. When there is an image forming apparatus 100 where an inspection or a repair is necessary, the server apparatus 300 can transmit information for identifying the image forming apparatus 100 (e.g., a service request) to the service person terminal 400 to instruct a service person to execute an inspection or a repair of the image forming apparatus 100.

The service person terminal 400 is an information processing apparatus such as a smartphone or a tablet terminal that is carried by the service person to execute the inspection or the repair of the image forming apparatus 100. In FIG. 1, only one service person terminal 400 is illustrated. However, the printing system may include a plurality of service person terminals 400. Then, the server apparatus 300 can also allocate an appropriate service person to the image forming apparatus 100 where an inspection or a repair is necessary based on information such as positional information of each of service persons who uses a position detection function of the service person terminal 400 or availability of each of the service persons.

Figure 2:
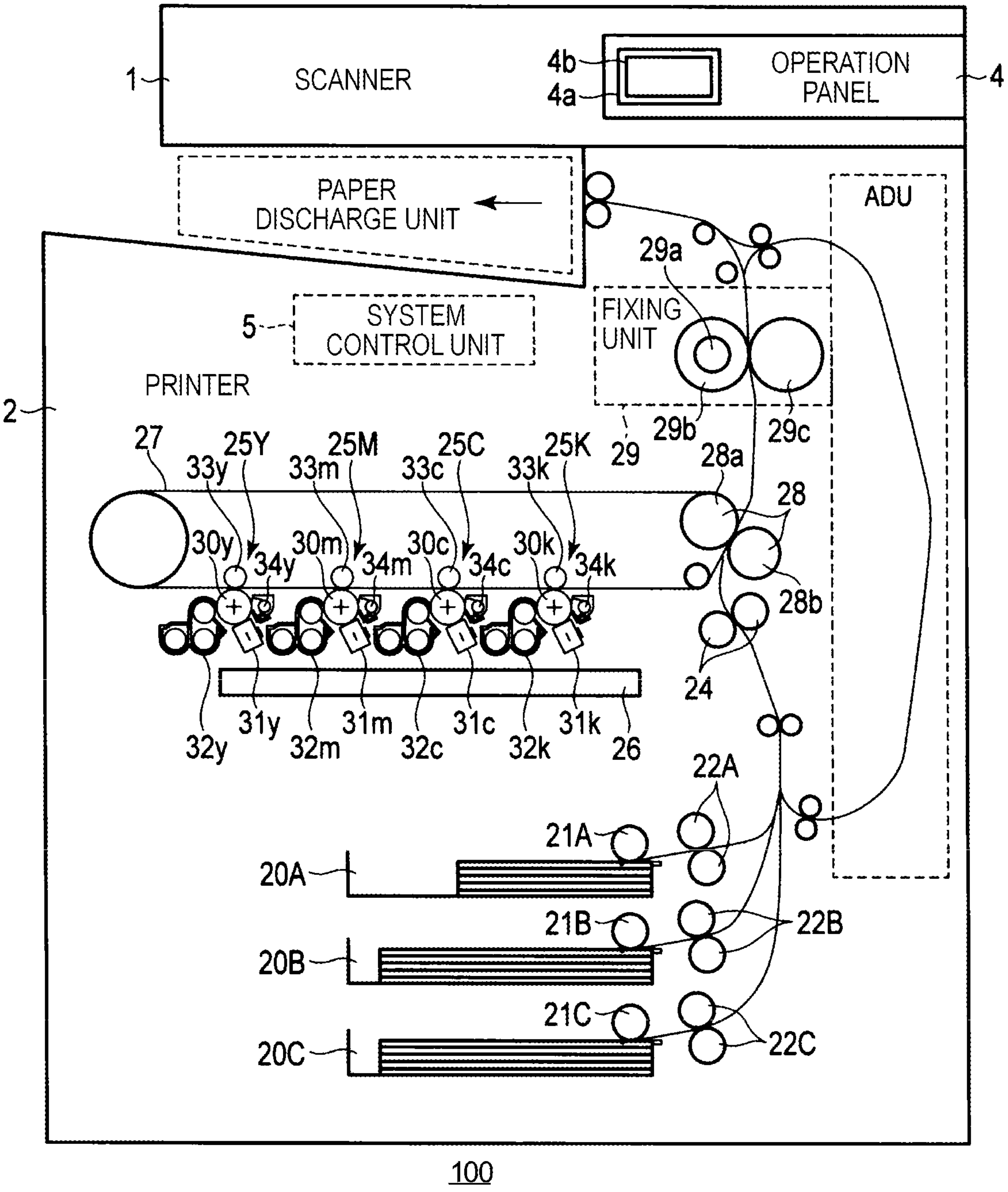
FIG. 2 is a cross-sectional view schematically illustrating a configuration example of the image forming apparatus.

FIG. 2 is a cross-sectional view schematically illustrating a configuration example of the image forming apparatus 100 according to the embodiment. The image forming apparatus illustrated in FIG. 2 is an MFP and includes a scanner 1, a printer 2, an operation panel 4, and a system control unit 5.

The scanner 1 reads an image of a document and converts the read image into image data. The scanner 1 is configured by, for example, a charge coupled device (CCD) line sensor that converts an image on a surface of a document to be read into image data. The scanner 1 may have a function of scanning a document placed on a document table glass. The scanner 1 may have a function of reading an image of a document conveyed by an auto document feeder (ADF). The scanner 1 is provided, for example, in a main body upper portion of the MFP. The scanner 1 is controlled by the system control unit 5. The scanner 1 outputs the image data of the document to the system control unit 5.

The printer 2 is an electrophotographic printer. The printer 2 forms an image on a paper as a recording medium. The printer 2 has a color printing function of printing a color image on a paper and a monochrome printing function of printing a monochrome (for example, black) image on a paper. The printer 2 forms a color image with toners of a plurality of colors (for example, three colors including yellow (Y), cyan (C), and magenta (M)). The printer 2 forms a monochrome image, for example, with a monochrome (for example, black (K)) toner.

In the configuration example illustrated in FIG. 2, the printer 2 includes paper feed cassettes 20 (20A, 20B, 20C). The paper feed cassette 20 is a paper feed unit that supplies paper on which an image is to be printed. The printer 2 may include, for example, a manual feed tray as the paper feed unit. For example, each of the paper feed cassettes 20A, 20B, and 20C is provided to be attachable to and detachable from a lower portion of the MFP main body. The paper feed cassettes 20A, 20B, and 20C accommodate sheets of paper of types (for example, size or paper quality) respectively set.

The paper feed cassettes 20A, 20B, and 20C include pickup rollers 21A, 21B, and 21C, respectively. The pickup rollers 21A, 21B, and 21C pick up the paper from the paper feed cassettes 20A, 20B, and 20C one by one, respectively. The pickup rollers 21A, 21B, and 21C supply the picked paper to a conveyance path (conveying unit 22) configured by a plurality of conveying rollers 22A, 22B, and 22C and the like.

The conveying unit 22 conveys the paper in the printer 2. For example, the conveying unit 22 conveys the paper picked by the pickup rollers 21A, 21B, and 21C to a registration roller 24. The registration roller 24 conveys the paper to a transfer position at a timing at which an image is transferred from a transfer belt 27 to the paper. The conveying unit 22 conveys the paper passed through the registration roller 24 to the transfer position. The conveying unit 22 conveys the paper passed through the transfer position from the transfer position to a fixing unit 29 (e.g., a heater). The conveying unit 22 conveys the paper passed through the fixing unit 29 to any of a paper discharge unit or an automatic double-sided unit (ADU).

Image forming units 25 (25Y, 25M, 25C, and 25K) form images to be transferred to the paper. In the configuration example illustrated in FIG. 2, the image forming unit 25Y forms an image with a yellow toner. The image forming unit 25M forms an image with a magenta toner. The image forming unit 25C forms an image with a cyan toner. The image forming unit 25K forms an image with a black toner.

Each of the image forming units 25 (25Y, 25M, 25C, and 25K) includes photoconductive drums 30 (30*y*, 30*m*, 30*c*, and 30*k*), charging units 31 (31*y*, 31*m*, 31*c*, and 31*k*), developing units 32 (32*y*, 32*m*, 32*c*, and 32*k*), transfer rollers 33 (33*y*, 33*m*, 33*c*, and 33*k*), and cleaners 34 (34*y*, 34*m*, 34*c*, and 34*k*).

The photoconductive drum 30 (e.g., a photoconductor) is an image carrier on which an electrostatic latent image is to be formed. The photoconductive drum 30 rotates around a rotation axis. The charging unit 31 charges a surface of the photoconductive drum 30 to a predetermined potential. The charging unit 31 includes a grid (not illustrated) for adjusting a charging output for the photoconductive drum 30. The developing unit 32 develops the electrostatic latent image formed on the surface of the photoconductive drum 30 with the toner. The transfer roller 33 transfers the developed toner image on the photoconductive drum 30 to the transfer belt 27. The cleaner 34 cleans the surface of the photoconductive drum 30 after the transfer.

An exposure unit 26 (e.g., a light source) forms an electrostatic latent image on the photoconductive drum 30 of each of the image forming units 25 (25Y, 25M, 25C, and 25K) with a laser beam. The exposure unit 26 irradiates the photoconductive drum 30 with a laser beam controlled according to the image data through an optical system such as a polygon mirror. The laser beam emitted from the exposure unit 26 forms the electrostatic latent image on the surface of each of the photoconductive drums 30. The exposure unit 26 controls the laser beam according to a control signal output from the system control unit 5.

In the image forming units 25 (25Y, 25M, 25C, and 25K), each of the developing units 32 develops the electrostatic latent image formed on the photoconductive drum 30, respectively. Each of the developing units 32 includes a developing container including a developing roller. The developing container contains a toner as a developer of a color. The toner is charged by being agitated in the developing container together with a carrier. A developing bias is applied to the developing roller. The developing roller to which the developing bias is applied supplies the toner to the electrostatic latent image on the photoconductive drum 30. The electrostatic latent image on the photoconductive drum 30 is developed as a toner image with the supplied toner.

The transfer belt 27 is an intermediate transfer medium. Each of the image forming units 25 (25Y, 25M, 25C, and 25K) applies a primary transfer voltage to the transfer belt 27 with the transfer roller 33 such that the toner image formed on the photoconductive drum 30 is transferred (primarily transferred) to the transfer belt 27. For example, in the image forming unit 25K, the transfer roller 33*k* transfers the toner image that is developed with black toner by the developing unit 32*k* to the transfer belt 27. When a color image is formed, the image forming units 25Y, 25M, 25C, and 25K transfer the toner images developed with the color toners to the transfer belt 27 by overlapping the toner images.

A transfer unit 28 transfers the toner image on the transfer belt 27 to the paper at a secondary transfer position. The secondary transfer position is a position at which the toner image on the transfer belt 27 is transferred to the paper. The secondary transfer position is a position where a support roller 28*a* and a secondary transfer roller 28*b* face each other.

The fixing unit 29 fixes the toner to the paper. The fixing unit 29 applies heat for fixing to the paper. In the example illustrated in FIG. 2, the fixing unit 29 is configured by a heating roller 29*b* where a heating unit 29*a* (e.g., a heater) is built in and a pressurization roller 29*c* that is in contact with a fixing belt heated by the heating roller 29*b* in a pressurized state. The heating unit 29*a* may be a heater that can control temperature. For example, the heating unit 29*a* may be configured by a heater lamp such as a halogen lamp or may be an induction heating (IH) type heater. The heating unit 29*a* may be configured by a plurality of heaters. The fixing unit 29 conveys the fixed paper to any of the paper discharge unit or the ADU.

The operation panel 4 is a user interface. The operation panel 4 includes various buttons and a display unit 4*a* including a touch panel 4*b*. The system control unit 5 controls the content to be displayed on the display unit 4*a* of the operation panel 4. The display unit 4*a* functions as a notification unit. The operation panel 4 outputs information input to the touch panel 4*b* of the display unit 4*a* or the buttons to the system control unit 5. A user designates an operation mode or inputs information such as setting information in the operation panel 4.

Next, a configuration of the exposure unit 26 will be described.

Figure 3:
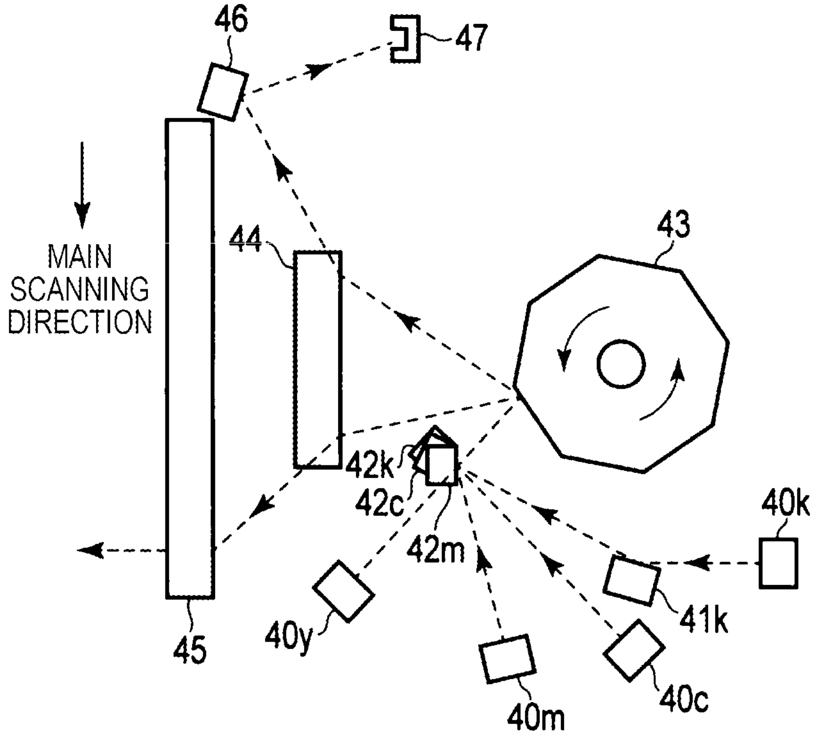
FIG. 3 is a diagram illustrating a configuration example of an exposure unit used in the image forming apparatus.
Figure 4:
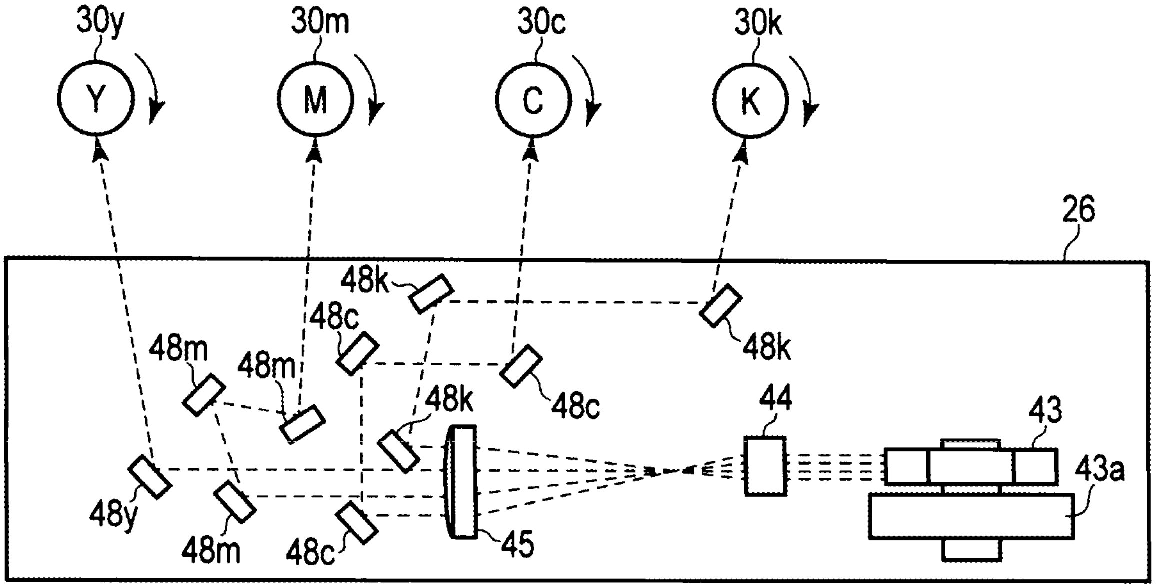
FIG. 4 is a cross-sectional view illustrating the configuration example of the exposure unit disposed in the image forming apparatus.

FIG. 3 is a diagram illustrating a configuration example of the exposure unit 26 used in the image forming apparatus 100. FIG. 4 is a cross-sectional view illustrating the configuration example of the exposure unit 26 provided in the image forming apparatus 100.

The exposure unit 26 illustrated in FIGS. 3 and 4 include exposure units for the colors forming an image. In the image forming apparatus 100 that forms a color image as illustrated in FIG. 2, the exposure unit 26 includes exposure units for the colors forming the color image. In the image forming apparatus that forms only a monochrome image, the exposure unit 26 may include one exposure unit for forming a monochrome image.

The exposure unit 26 illustrated in FIGS. 3 and 4 include exposure units for the colors including yellow, magenta, cyan, and black and a beam detection (BD) unit. The exposure units for the colors include laser units 40 (40*y*, 40*m*, 40*c*, and 40*k*) and an optical system. Each of the laser units 40 includes a plurality of light emitting elements (e.g., light sources). For example, each of the laser units 40 is configured by a laser array where a plurality of laser diodes (LD) are arranged. The optical system configuring the exposure units of the colors includes a mirror 41*k*, mirrors 42 (42*m*, 42*c*, and 42*k*), a polygon mirror 43, lenses 44 and 45, mirror groups 48 (48*y*, 48*m*, 48*c*, and 48*k*), and the like.

The exposure unit for yellow includes the laser unit 40*y*, the polygon mirror 43, the lenses 44 and 45, and the mirror group 48*y*. The laser unit 40*y* emits a laser beam for forming a yellow image. The polygon mirror 43, the lenses 44 and 45, and the mirror group 48*y* configure an optical system for guiding the laser beam emitted from the laser unit 40*y* to the photoconductive drum 30*y*. The polygon mirror 43 is rotated by a polygon mirror motor 43*a*. The polygon mirror 43 rotates to deflect the laser beam to the photoconductive drum 30*y* in a main scanning direction. The main scanning direction is a direction of the rotation axis of the photoconductive drum 30*y*. A scanning position of the laser beam emitted from the laser unit 40*y* is moved by the rotating polygon mirror 43 in a sub-scanning direction on the photoconductive drum 30*y*. The sub-scanning direction is a direction perpendicular to the main scanning direction.

The exposure unit for magenta includes the laser unit 40*m*, the mirror 42*m*, the polygon mirror 43, the lenses 44 and 45, and the mirror group 48*m*. The laser unit 40*m* emits a laser beam for forming a magenta image. The polygon mirror 43, the lenses 44 and 45, and the mirror group 48*m* configure an optical system for guiding the laser beam emitted from the laser unit 40*m* to the photoconductive drum 30*m*. The polygon mirror 43 is rotated by the polygon mirror motor 43*a*. The polygon mirror 43 rotates to deflect the laser beam to the photoconductive drum 30*m* in the main scanning direction. The main scanning direction is a direction of the rotation axis of the photoconductive drum 30*m*. A scanning position of the laser beam emitted from the laser unit 40*m* is moved by the rotating polygon mirror 43 in the sub-scanning direction on the photoconductive drum 30*m*. The sub-scanning direction is a direction perpendicular to the main scanning direction.

The exposure unit for cyan includes the laser unit 40*c*, the mirror 42*c*, the polygon mirror 43, the lenses 44 and 45, and the mirror group 48*c*. The laser unit 40*c* emits a laser beam for forming a cyan image. The polygon mirror 43, the lenses 44 and 45, and the mirror group 48*c* configure an optical system for guiding the laser beam emitted from the laser unit 40*c* to the photoconductive drum 30*c*. The polygon mirror 43 is rotated by the polygon mirror motor 43*a*. The polygon mirror 43 rotates to deflect the laser beam to the photoconductive drum 30*c* in the main scanning direction. The main scanning direction is a direction of the rotation axis of the photoconductive drum 30*c*. A scanning position of the laser beam emitted from the laser unit 40*c* is moved by the rotating polygon mirror 43 in the sub-scanning direction on the photoconductive drum 30*c*. The sub-scanning direction is a direction perpendicular to the main scanning direction.

The exposure unit for black includes the laser unit 40*k*, the mirrors 41*k* and 42*k*, the polygon mirror 43, the lenses 44 and 45, and the mirror group 48*k*. The laser unit 40*k* emits a laser beam for forming a black image. The polygon mirror 43, the lenses 44 and 45, and the mirror group 48*k* configure an optical system for guiding the laser beam emitted from the laser unit 40*k* to the photoconductive drum 30*k*. The polygon mirror 43 is rotated by the polygon mirror motor 43*a*. The polygon mirror 43 rotates to deflect the laser beam to the photoconductive drum 30*k* in the main scanning direction. The main scanning direction is a direction of the rotation axis of the photoconductive drum 30*k*. A scanning position of the laser beam emitted from the laser unit 40*k* is moved by the rotating polygon mirror 43 in the sub-scanning direction on the photoconductive drum 30*k*. The sub-scanning direction is a direction perpendicular to the main scanning direction.

The BD detection unit of the exposure unit 26 includes a mirror 46 and a BD sensor 47. The mirror 46 guides the laser beam that is deflected by the polygon mirror 43 to the BD sensor 47. The BD sensor 47 detects a laser beam emitted from any one light source in the laser units 40. The BD sensor 47 detects the laser beam as signals (a BD signal and a reference signal) that are references for the scanning in the main scanning direction. The BD sensor 47 is set on a scanning line along which a laser beam from a reference light emitting element (LD) to be detected is deflected. That is, the BD sensor 47 detects that the laser beam is at a reference position in the main scanning direction. The LD of each of the laser units 40 controls the emission of the laser beam based on the BD signal detected by the BD sensor 47.

Next, a configuration of a control system in the image forming apparatus 100 will be described.

Figure 5:
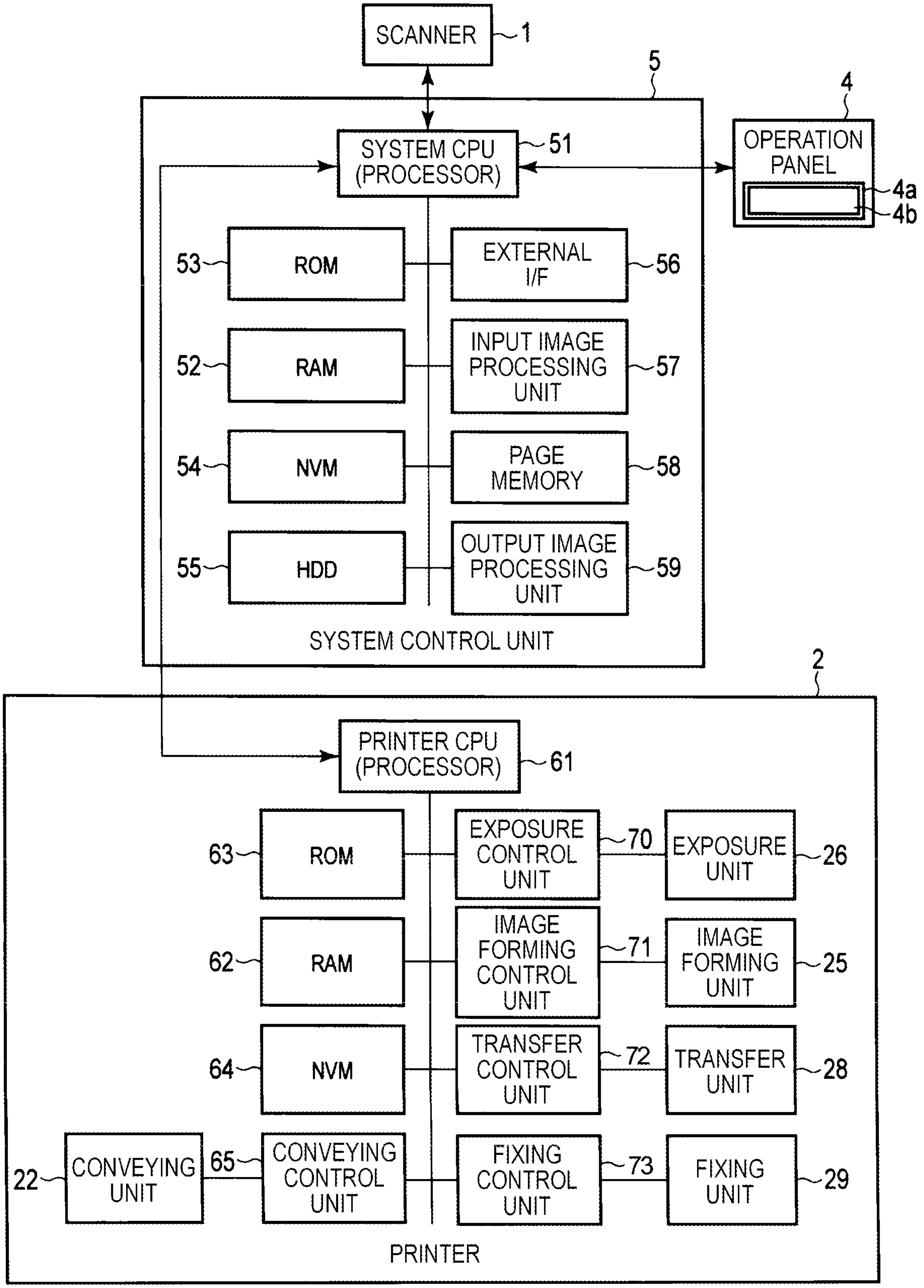
FIG. 5 is a block diagram illustrating a configuration example of a control system in the image forming apparatus.

FIG. 5 is a block diagram schematically illustrating a configuration example of the control system in the system control unit 5 and the printer 2 of the image forming apparatus 100.

In the configuration example, the system control unit 5 (e.g., a controller) includes a system central processing unit (CPU) 51 that is a processor, a random access memory (RAM) 52, a read only memory (ROM) 53, a non-volatile memory (in the drawing, represented by NVM) 54, a hard disk drive (HDD) 55, an external interface (in the drawing, represented by I/F) 56, an input image processing unit 57, a page memory 58, and an output image processing unit 59.

The system CPU 51 is a control unit that integrally controls each of the units of the image forming apparatus 100. The system CPU 51 is a processor that implements a process by executing a program. The system CPU 51 is connected to each of the units in the system control unit 5 via a system bus. The system CPU 51 is also connected to the scanner 1, the printer 2, the operation panel 4, and the like via the system bus. The system CPU 51 outputs an operation instruction to each of the units or acquires various types of information from each of the units through bidirectional communication with the scanner 1, the printer 2, and the operation panel 4.

The CPU that is a processor configuring the control unit is a multi-core or multi-thread CPU and executes a plurality of processes in parallel. The processor is not limited to a CPU but may be a micro processing unit (MPU). The processor may be implemented by other various forms including an integrated circuit such as an application specific integrated circuit (ASIC), a graphics processing unit (GPU), a field-programmable gate array (FPGA), a digital signal processor (DSP), a system on a chip (SoC), or a programmable logic device (PLD). The processor may be configured by a combination of a plurality of units among the above-described examples.

The RAM 52 is configured by a volatile memory. The RAM 52 functions as a working memory or a buffer memory. The ROM 53 is a non-rewritable non-volatile memory that stores a program, control data, and the like. The system CPU 51 implements various processes by executing programs stored in the ROM 53 (or the non-volatile memory 54 or the HDD 55) while using the RAM 52. For example, the system CPU 51 implements a function of instructing to execute printing and a function of prohibiting printing by executing programs.

The non-volatile memory 54 is a rewritable non-volatile memory. The non-volatile memory 54 stores a control program and control data to be executed by the system CPU 51. The non-volatile memory 54 stores various types of setting information, process conditions, and the like. For example, the non-volatile memory 54 stores setting information for each of the paper feed cassettes (paper feed units).

The HDD 55 is a mass storage device. The HDD 55 stores image data, various types of operation history information, and the like. The HDD 55 may store a control program, control data, and the like. The HDD 55 may store setting information, process conditions, and the like.

The external interface 56 (e.g., a network interface) is an interface for communication with an external apparatus. For example, the external interface 56 receives a print job from the user terminal 200 as an external apparatus, or transmits data to the server apparatus 300 as an external apparatus. The external interface 56 may be an interface for data communication with an external apparatus.

The input image processing unit 57 processes the image data read from the scanner 1. The input image processing unit 57 has functions of, for example, a shading correction process, a grayscale conversion process, an inter-line correction process, and a compression and decompression process. The input image processing unit 57 stores the processed image data in the page memory 58.

The page memory 58 is a memory for loading the image data. For example, the page memory 58 stores the image data obtained by the input image processing unit 57 processing the image data read from the scanner 1. The page memory 58 may store image data in a print job acquired by the external interface 56.

The output image processing unit 59 generates image data for printing that is to be printed on a paper by the printer 2. The output image processing unit 59 executes image processing of converting the image data stored in the page memory 58 into the image data for printing. The output image processing unit 59 transmits the processed image data to the printer 2.

Next, a configuration example of a control system in the printer 2 will be described.

In the configuration example illustrated in FIG. 5, the printer 2 includes, as the configuration of the control system, a printer CPU 61, a RAM 62, a ROM 63, a non-volatile memory (NVM) 64, a conveying control unit 65, an exposure control unit 70, an image forming control unit 71, a transfer control unit 72, and a fixing control unit 73. The printer CPU 61, the RAM 62, the ROM 63, the non-volatile memory (NVM) 64, the conveying control unit 65, the exposure control unit 70, the image forming control unit 71, the transfer control unit 72, and the fixing control unit 73 may form a controller of the printer 2.

The printer CPU 61 controls the entire printer 2. The printer CPU 61 is a processor that implements a process by executing a program. The processor is not limited to a CPU, and may be implemented by other various forms including an integrated circuit such as MPU, ASIC, GPU, FPGA, DSP, SoC, or PLD. The processor may be configured by a combination of a plurality of units among the above-described examples. The printer CPU 61 is connected to each of the units in the printer 2 via a system bus or the like. The printer CPU 61 outputs an operation instruction to each of the units in the printer 2 according to the operation instruction from the system CPU 51. The printer CPU 61 notifies information representing a process situation of the printer 2 to the system CPU 51.

The RAM 62 is configured by a volatile memory. The RAM 62 functions as a working memory or a buffer memory. The ROM 63 is a non-rewritable non-volatile memory that stores a program, control data, and the like. The printer CPU 61 implements various processes by executing programs stored in the ROM 63 (or the non-volatile memory 64) while using the RAM 62.

Figure 6:
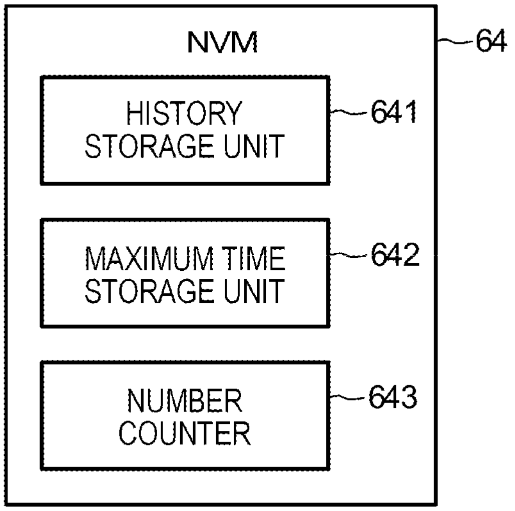
FIG. 6 is a block diagram illustrating a configuration example of a non-volatile memory of a printer in the image forming apparatus.

The non-volatile memory 64 is a rewritable non-volatile memory. For example, the non-volatile memory 64 stores a control program and control data to be executed by the printer CPU 61 and history data generated by the printer CPU 61 executing the control program. The non-volatile memory 64 may store various types of setting information, process conditions, and the like. FIG. 6 is a block diagram illustrating a configuration example of the non-volatile memory 64. In the embodiment, the non-volatile memory 64 is a storage unit for storing history data regarding a first period of time, and includes, for example, a history storage unit 641, a maximum time storage unit 642, and a number counter 643.

The history storage unit 641 is a memory that stores, as the history data regarding the first period of time, the first periods of time corresponding to a predetermined number of times (e.g., occurrences, instances, etc.), for example, 10 times in order from the latest to the earliest. The first period of time (e.g., a spin up time) is an amount of time taken until a rotation speed of the polygon mirror motor 43*a* reaches a target rotation speed range (e.g., from a stationary condition of the polygon mirror motor 43*a*). The details of the first period of time will be described below.

The maximum time storage unit 642 is a memory that stores, as the history data regarding the first period of time, the maximum first period of time until now.

The number counter 643 is a counter that stores, as the history data regarding the first period of time, a number or quantity of times (e.g., occurrences, instances, etc.) the first period of time was between a second period of time (e.g., a first threshold time) and a third period of time (e.g., a second threshold time). The second period of time is predefined as a period of time in which the rotation speed of the polygon mirror motor 43*a* is in the target rotation speed range. The third period of time is predefined as a period of time required to determine that the polygon mirror motor 43*a* is broken. The details of the second and third periods of time will be described below.

The conveying control unit 65 controls the conveyance of the paper in the printer 2. The conveying control unit 65 controls the driving of the pickup rollers 21 and the conveying roller 22A, 22B, and 22C and the like of the conveying unit 22. The conveying control unit 65 controls the driving of the conveying roller 22A, 22B, and 22C as the conveying unit 22 in the printer 2 according to the operation instruction from the printer CPU 61. For example, the printer CPU 61 instructs the conveying control unit 65 to control the conveyance of the paper according to an instruction of the start of printing from the system control unit 5.

The exposure control unit 70 controls the exposure unit 26. The exposure control unit 70 causes the exposure unit 26 to form the electrostatic latent images on the photoconductive drums 30 (30*y*, 30*m*, 30*c*, and 30*k*) of the image forming units 25 (25Y, 25M, 25C, and 25K), respectively, according to an operation instruction from the printer CPU 61. For example, the exposure control unit 70 controls the laser beam with which the exposure unit 26 irradiates each of the photoconductive drums 30 according to the image data for which the printer CPU 61 is instructed to execute printing. For example, the exposure control unit 70 controls the deflection of the laser beam emitted from each of the laser units based on the BD signal acquired from the exposure unit 26.

The image forming control unit 71 controls the driving of each of the image forming units 25 (25Y, 25M, 25C, and 25K). For example, the image forming control unit 71 causes the charging unit 31 to charge the photoconductive drum 30 to a predetermined potential. The image forming control unit 71 causes the developing unit 32 to develop the electrostatic latent image formed on the charged photoconductive drum 30 to form a toner image of each of the colors. The image forming control unit 71 controls the density of the toner to be developed by controlling a developing bias or the like of the developing unit 32. The image forming control unit 71 causes the transfer roller 33 to transfer the toner image developed on the photoconductive drum 30 to the transfer belt 27. The image forming control unit 71 causes the cleaner 34 to clean the surface of the photoconductive drum 30 after the transfer process.

The transfer control unit 72 controls the driving, a transfer current, and the like of the transfer unit 28. The transfer control unit 72 causes the transfer unit 28 to transfer the toner image transferred to the transfer belt 27 to the paper according to an operation instruction from the printer CPU 61. The fixing control unit 73 controls the driving of the fixing unit 29. The fixing control unit 73 drives the heating roller 29*b* and the pressurization roller 29*c* according to an operation instruction from the printer CPU 61. The fixing control unit 73 controls the heating unit 29*a* such that the surface temperature of the heating roller 29*b* is controlled to a fixing temperature.

In the image forming apparatus 100 having the above-described configuration, when the power is input by an ON operation of a power supply switch (not illustrated), the system CPU 51 and the printer CPU 61 execute operations based on the programs stored in the ROMs 53 and 63 (or the non-volatile memories 54 and 64), respectively. For example, the system CPU 51 instructs the printer 2 to execute printing indicated by a print job from the user terminal 200 in response to reception of the print job, or scans a document with the scanner 1 according to a copy instruction given by a user through the touch panel 4*b* of the operation panel 4 and then instructs the printer 2 to print the scanned image of the document. The printer CPU 61 of the printer 2 executes printing according to the printing instruction from the system CPU 51.

Figure 7:
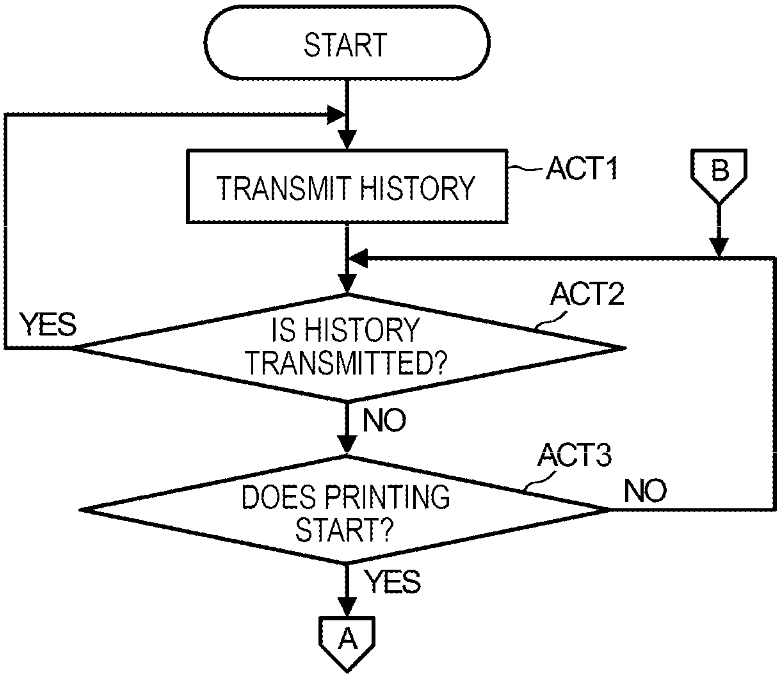
FIG. 7 is a diagram illustrating a first portion of a sequential flowchart illustrating an operation example of a diagnostic operation of a polygon mirror motor in the image forming apparatus.
Figure 8:
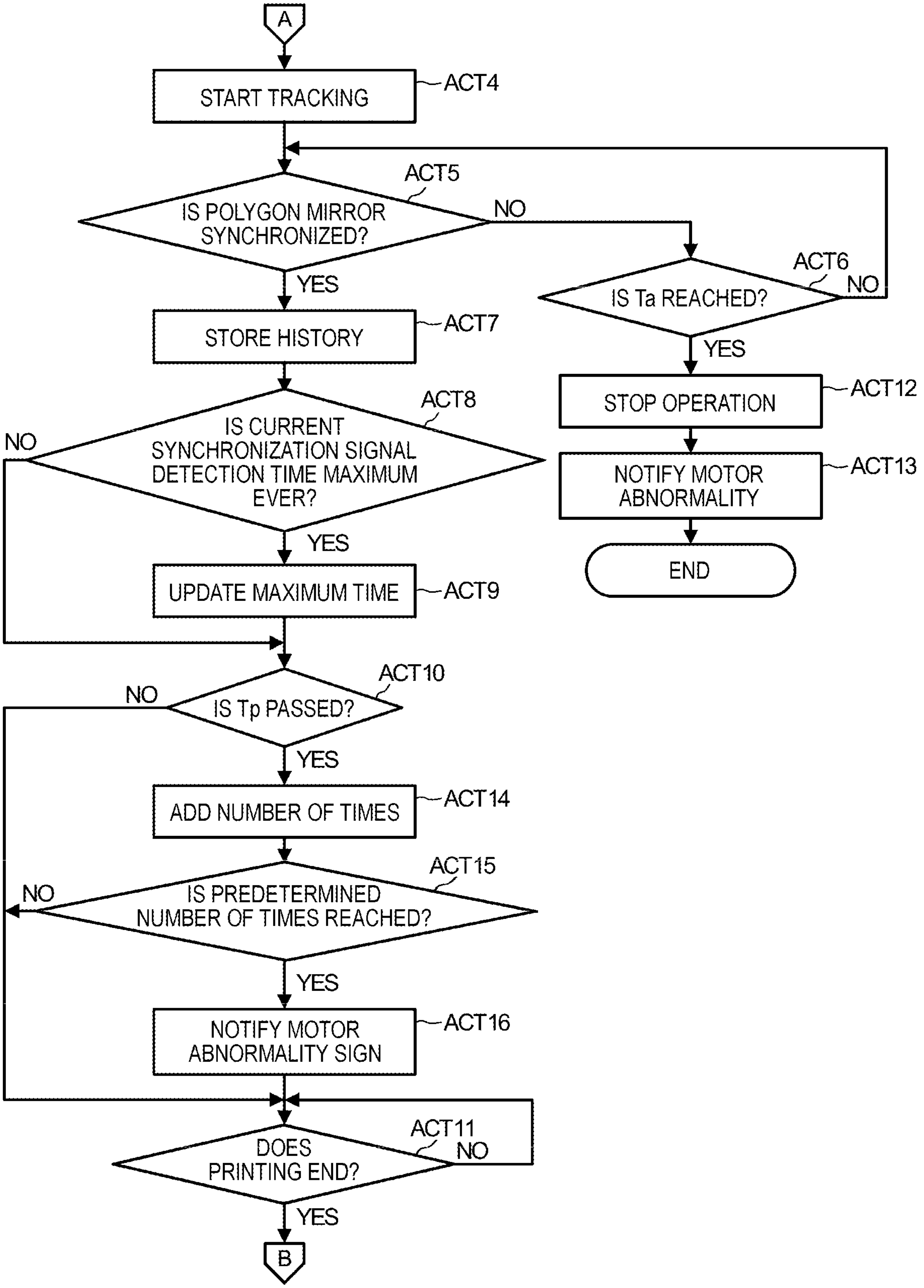
FIG. 8 is a diagram illustrating a second portion of the sequential flowchart illustrating the operation example of the diagnostic operation of the polygon mirror motor.

In addition to the normal operation, the printer CPU 61 executes a malfunction position diagnostic operation of each of the units of the printer 2. One of the malfunction position diagnostic operations is a diagnostic operation of the polygon mirror motor 43*a*. FIGS. 7 and 8 are a sequential flowchart illustrating an operation example of the diagnostic operation of the polygon mirror motor 43*a*. The content of the process illustrated in FIGS. 7 and 8 and described below is merely exemplary, and various processes capable of obtaining the same result can be appropriately used. For example, when the power is input by the ON operation of the power supply switch, the printer CPU 61 executes the process of the diagnostic operation based on the control program stored in the non-volatile memory 64. Unless specified otherwise, the process of the printer CPU 61 proceeds from ACT n (n represents a natural number) to ACT (n+1).

In ACT 1, the printer CPU 61 transmits the history data regarding the first period of time stored in the non-volatile memory 64 to the server apparatus 300. Specifically, the printer CPU 61 reads the history data stored in the non-volatile memory 64, and requests the system CPU 51 of the system control unit 5 to transmit the history data. In response to the request, the system CPU 51 transmits the history data to the server apparatus 300 via the external interface 56. The history data to be transmitted to the server apparatus 300 may be all of the first periods of time corresponding to, for example, the most recent 10 times (e.g., 10 occurrences) stored in the history storage unit 641, the maximum first period of time stored in the maximum time storage unit 642, and the number of times stored in the number counter 643, or may be any one or two thereof.

In ACT 2, the printer CPU 61 determines whether to transmit the history data to the server apparatus 300. Specifically, the printer CPU 61 determines whether a read request of the history data is transmitted from the system CPU 51. When a transmission request of the history data is received from the server apparatus 300, the system CPU 51 transmits the read request of the history data to the printer CPU 61. The printer CPU 61 proceeds to the process operation of ACT 1 based on the determination that the read request of the history data is transmitted, that is, the determination to transmit the history data to the server apparatus 300 (ACT 2, YES).

In ACT 3, the printer CPU 61 determines whether to start printing based on the determination that the read request of the history data is not transmitted, that is, the determination to not transmit the history data to the server apparatus 300 (ACT 2, NO). Specifically, the printer CPU 61 determines whether a print instruction is transmitted from the system CPU 51. The printer CPU 61 proceeds to the process operation of ACT 2 based on the determination to not start printing (ACT 3, NO).

In ACT 4, the printer CPU 61 starts to track time based on the determination to start printing (ACT 3, YES).

Figure 9:
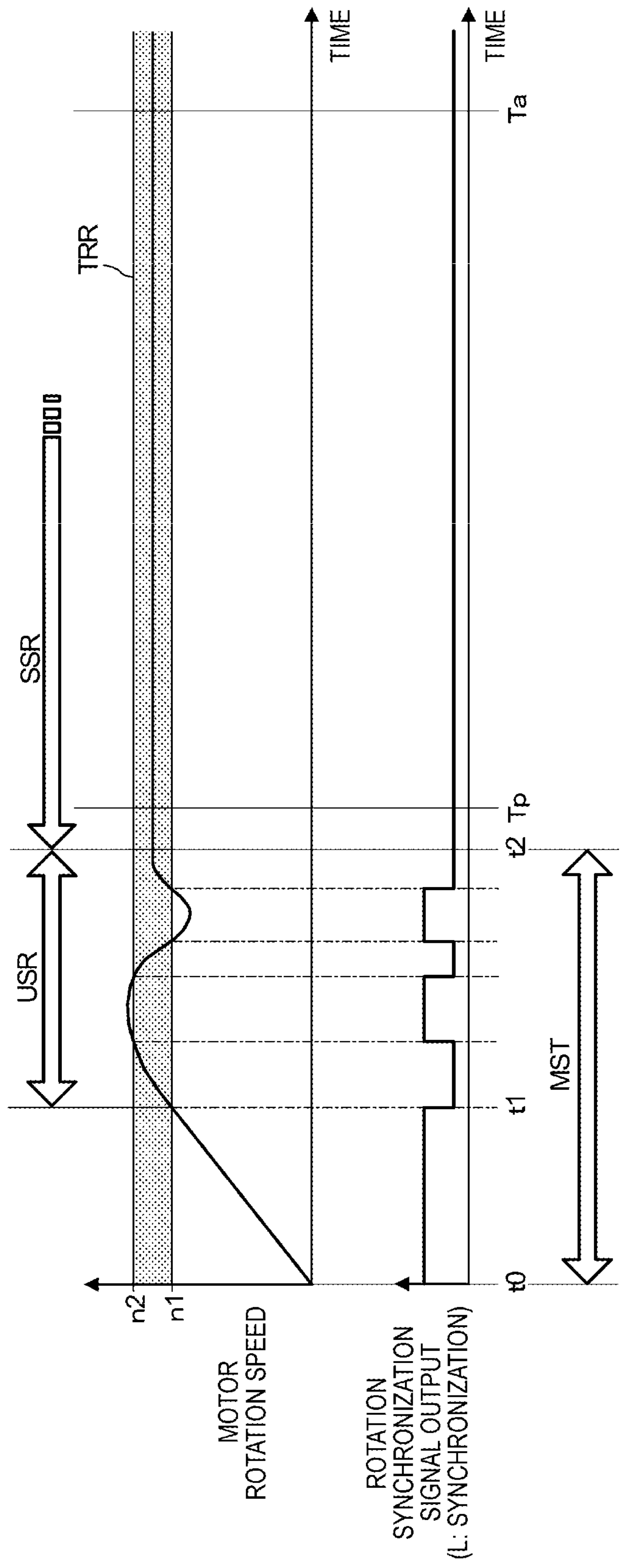
FIG. 9 is a time chart illustrating a relationship between a motor rotation speed and a rotation synchronization signal when the polygon mirror motor is normal.

FIG. 9 is a time chart illustrating a relationship between a motor rotation speed and a rotation synchronization signal when the polygon mirror motor 43*a* is normal.

At time t0 that is the time of start of printing, a rotation ON signal is transmitted from the printer CPU 61 to the polygon mirror motor 43*a* of the exposure unit 26. In response to the rotation ON signal, the rotation of the polygon mirror motor 43*a* starts. A target rotation speed range TRR is defined according to a clock supplied from the printer CPU 61 to the polygon mirror motor 43*a* or a clock provided in the polygon mirror motor 43*a*. The rotation speed of the polygon mirror motor 43*a* increases, and when the rotation speed enters the target rotation speed range TRR, the polygon mirror motor 43*a* enters a steady rotation state. While the rotation speed of the polygon mirror motor 43*a* is in the target rotation speed range TRR, a rotation synchronization signal is transmitted from the polygon mirror motor 43*a* to the printer CPU 61. The printer CPU 61 detects the synchronization signal and continues the printing operation.

Note that, even when the rotation speed is in the target rotation speed range TRR, the motor rotation speed is not immediately stabilized in a steady rotation region SSR of the polygon mirror motor 43*a*. That is, when the motor rotation speed initially reaches the target rotation speed range TRR, the rotation overshoots. Therefore, the rotation speed is adjusted to be maintained in the target rotation speed range TRR. During the adjustment period, the motor rotation speed moves up and down and becomes unstable. The synchronization signal also repeats ON and OFF multiple times, and finally the steady rotation state is continued. When the polygon mirror motor 43*a* is not in the steady rotation state, the scanning speed of the laser beam that is deflected by the rotation of the polygon mirror becomes unstable, and distortion occurs in printing. Therefore, the printer CPU 61 executes the printing operation after waiting for a period of time corresponding to a rotation speed unstable region USR from time t1 that is an initial synchronization signal detection timing. The rotation speed unstable region USR is calculated based on a parameter such as the performance of the polygon mirror motor 43*a* or the weight of the polygon mirror 43, and Is stored in the non-volatile memory 64 as setting information for each of the image forming apparatuses 100. For example, the rotation speed unstable region USR is about 0.5 seconds to 1.5 seconds.

A period of time from the time t0, at which the polygon mirror motor 43*a* starts to rotate, to time t2, at which the polygon mirror motor 43*a* enters the steady rotation state after waiting for the rotation speed unstable region USR from the time t1 as the initial synchronization signal detection timing, is defined as a motor start time MST. For example, assuming that the time t1 is 2 seconds from the time t0 that is the start of printing as a starting point and the rotation speed unstable region USR is 0.5 seconds from the time t1 as a starting point, the motor start time MST is 2.5 seconds.

When a malfunction occurs in the polygon mirror motor 43*a*, there are two failure modes including a mode where the rotation speed of the polygon mirror motor 43*a* does not reach the target rotation speed range TRR and a mode where the motor rotation speed reaches the target rotation speed range TRR but the motor start time MST is longer than the normal case.

In the former mode, the scanning speed of the laser beam is slower than that at the normal case, and the rotation is also unstable. Therefore, an image malfunction such as shrink or distortion occurs, and thus the polygon mirror motor 43*a* cannot be used. To prevent erroneous determination of motor breakdown, a period of time (e.g., a predetermined period of time) that is sufficiently longer than the motor start time MST at the normal case (e.g., an amount of time required for the polygon mirror motor 43*a* to reach the target rotation speed range TRR during normal operation of the polygon mirror motor 43*a*, when the polygon mirror motor 43*a* is not malfunctioning) is used as a period of time required for the printer CPU 61 to determine complete breakdown of the polygon mirror motor 43*a*. Hereinafter, the period of time will be referred to as an abnormality occurrence determination time Ta. For example, the abnormality occurrence determination time Ta is 30 seconds from the time t0 that is the start of printing as a starting point. The abnormality occurrence determination time Ta is stored in the non-volatile memory 64 as setting information for each of the image forming apparatuses 100.

On the other hand, in the latter mode, the polygon mirror motor 43*a* is not completely broken and can be used, as the rotation speed of the polygon mirror motor 43*a* reaches the target rotation speed range TRR. However, the polygon mirror motor 43*a* may eventually enter the unusable state as in the former mode. Therefore, by detecting the latter state and executing a repair before the polygon mirror motor 43*a* becomes completely unusable, the image forming apparatus 100 can be prevented from becoming completely unusable. Alternatively, by requesting a repair in advance, even when breakdown occurs before actually executing a repair, an unusable period until the repair can be reduced. In the embodiment, to detect the latter state, a period of time that is shorter than the abnormality occurrence determination time Ta required for the printer CPU 61 to determine complete breakdown of the polygon mirror motor 43*a* and is longer than the motor start time MST at the normal case is set as an abnormality possibility determination time Tp. In the above-described example, the abnormality possibility determination time Tp is any period of time of longer than 2.5 seconds and shorter than 30 seconds from the time t0 that is the start of printing as a starting point. The abnormality possibility determination time Tp may be set to be the same as the motor start time MST at the normal case or longer and shorter than the abnormality occurrence determination time Ta. However, to prevent erroneous determination, it is desirable that the abnormality possibility determination time Tp is longer than the motor start time MST at the normal case to a certain degree at least. The abnormality possibility determination time Tp is stored in the non-volatile memory 64 as setting information for each of the image forming apparatuses 100.

In the embodiment, the time t1 is the first period of time described above. The abnormality possibility determination time Tp, which is defined based on the motor start time MST at the normal case, is the second period of time, and the abnormality occurrence determination time Ta is the third period of time.

The description will be made referring back to FIG. 8. In ACT 5, the printer CPU 61 determines whether the polygon mirror motor 43*a* is in a synchronized state. Specifically, the printer CPU 61 determines whether the rotation synchronization signal transmitted from the polygon mirror motor 43*a* is in a low state.

In ACT 6, the printer CPU 61 determines whether the tracked time reaches the abnormality occurrence determination time Ta based on the determination that the rotation synchronization signal is not in the synchronized state (ACT 5, NO). The printer CPU 61 proceeds to the process operation of ACT 5 based on the determination that the tracked time does not reach the abnormality occurrence determination time Ta (ACT 6, NO).

As such, the printer CPU 61 repeats the process operations of ACT 5 and ACT 6 until the polygon mirror motor 43*a* enters the synchronized state or the tracked time reaches the abnormality occurrence determination time Ta. It can be said that the printer CPU 61 waits until the polygon mirror motor 43*a* enters the synchronized state or the tracked time reaches the abnormality occurrence determination time Ta.

In ACT 7, the printer CPU 61 stores history based on the determination that the polygon mirror motor 43*a* is in the synchronized state (ACT 5, YES). Specifically, the printer CPU 61 additionally stores the initial synchronization signal detection time t1 that is the first period of time in the history storage unit 641. When the first periods of time corresponding to the predetermined number of times, for example, 10 times are stored in the history storage unit 641 in advance, the printer CPU 61 erases the earliest first period of time from the history storage unit 641 and additionally stores the current first period of time, that is, the latest first period of time.

In ACT 8, the printer CPU 61 determines whether the current synchronization signal detection time t1 is the maximum ever (e.g., beyond the stored 10 times, the maximum value of the first time period ever measured). Specifically, the printer CPU 61 determines whether the current synchronization signal detection time t1 is longer than the maximum first period of time stored in the maximum time storage unit 642. The printer CPU 61 proceeds to the process operation of ACT 10 described below based on the determination that the current synchronization signal detection time t1 is not the maximum ever (ACT 8, NO).

In ACT 9, the printer CPU 61 updates the maximum first period of time stored in the maximum time storage unit 642 by the current synchronization signal detection time t1 based on the determination that the current synchronization signal detection time t1 is the maximum ever (ACT 8, YES).

In ACT 10, the printer CPU 61 determines whether the abnormality possibility determination time Tp is passed from the current synchronization signal detection time t1. When the abnormality possibility determination time Tp is not passed, it can be said that the polygon mirror motor 43*a* operates normally.

In ACT 11, the printer CPU 61 determines whether to end printing, that is, whether to stop the polygon mirror motor 43*a* based on the determination that the abnormality possibility determination time Tp is not passed (ACT 10, NO). The printer CPU 61 repeats the process operation of ACT 11 based on the determination that printing does not end (ACT 11, NO). That is, the printer CPU 61 continues the process operation of ACT 11 until determining that printing ends. It can also be said that the printer CPU 61 waits until printing ends. The printer CPU 61 proceeds to the process operation of ACT 2 based on the determination to end printing (ACT 11, YES).

As described above, at the start of printing, that is, at the start of rotation of the polygon mirror motor 43*a*, the printer CPU 61 updates the storage content of the history storage unit 641, and updates the storage content of the maximum time storage unit 642 when necessary.

Figure 10:
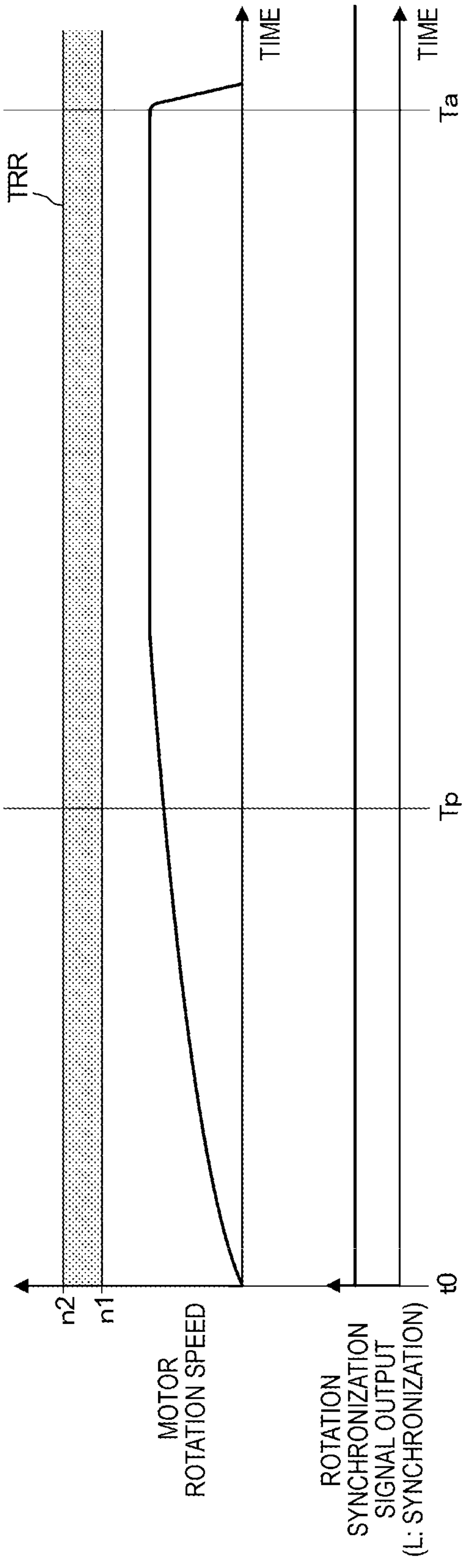
FIG. 10 is a time chart illustrating a relationship between the motor rotation speed and the rotation synchronization signal when the polygon mirror motor is broken.

FIG. 10 is a time chart illustrating a relationship between the motor rotation speed and the rotation synchronization signal when the polygon mirror motor 43*a* is broken. When a malfunction occurs in the polygon mirror motor 43*a*, as illustrated in FIG. 10, the rotation speed of the polygon mirror motor 43*a* does not reach the target rotation speed range TRR until the abnormality occurrence determination time Ta.

Here, in ACT 6 described above, the printer CPU 61 determines that the tracked time reaches the abnormality occurrence determination time Ta. In ACT 12, the printer CPU 61 stops the operation of the printer 2 based on the determination that the tracked time reaches the abnormality occurrence determination time Ta (ACT 6, YES). As a result, as illustrated in FIG. 10, the polygon mirror motor 43*a* stops the rotation.

In ACT 13, the printer CPU 61 notifies motor abnormality to the system CPU 51. Then, the printer CPU 61 ends the operation. The system CPU 51 that receives the notification of the motor abnormality causes the display unit 4*a* of the operation panel 4 to display that the polygon mirror motor 43*a* is broken such that printing cannot be executed. The user who sees the display can request a maintenance and inspection company for a repair. The system CPU 51 may notify the motor abnormality to the server apparatus 300 via the external interface 56. As a result, the server apparatus 300 can request a repair of the image forming apparatus 100 to the service person terminal 400.

The notification of the motor abnormality transmitted from the printer CPU 61 to the system CPU 51 and the notification of the motor abnormality transmitted from the system CPU 51 to the server apparatus 300 may include the history data regarding the first period of time stored in the non-volatile memory 64. The history data regarding the first period of time may be all of the first periods of time corresponding to, for example, the recent 10 times stored in the history storage unit 641, the maximum first period of time stored in the maximum time storage unit 642, and the number of times stored in the number counter 643, or may be any one or two thereof. When the server apparatus 300 requests a repair of the image forming apparatus 100 to the service person terminal 400, the history data can also be transmitted. As a result, the service person who uses the service person terminal 400 does not need to execute a read operation of the storage content of the non-volatile memory 64 using the image forming apparatus 100, and can check in advance the operation history of the broken polygon mirror motor 43*a* to be repaired.

As described above, when the rotation of the polygon mirror motor 43*a* starts and the abnormality occurrence determination time Ta is passed while the rotation speed does not reach the target rotation speed range TRR, the printer CPU 61 determines that abnormality such as breakdown occurs in the polygon mirror motor 43*a*, and ends the operation.

Figure 11:
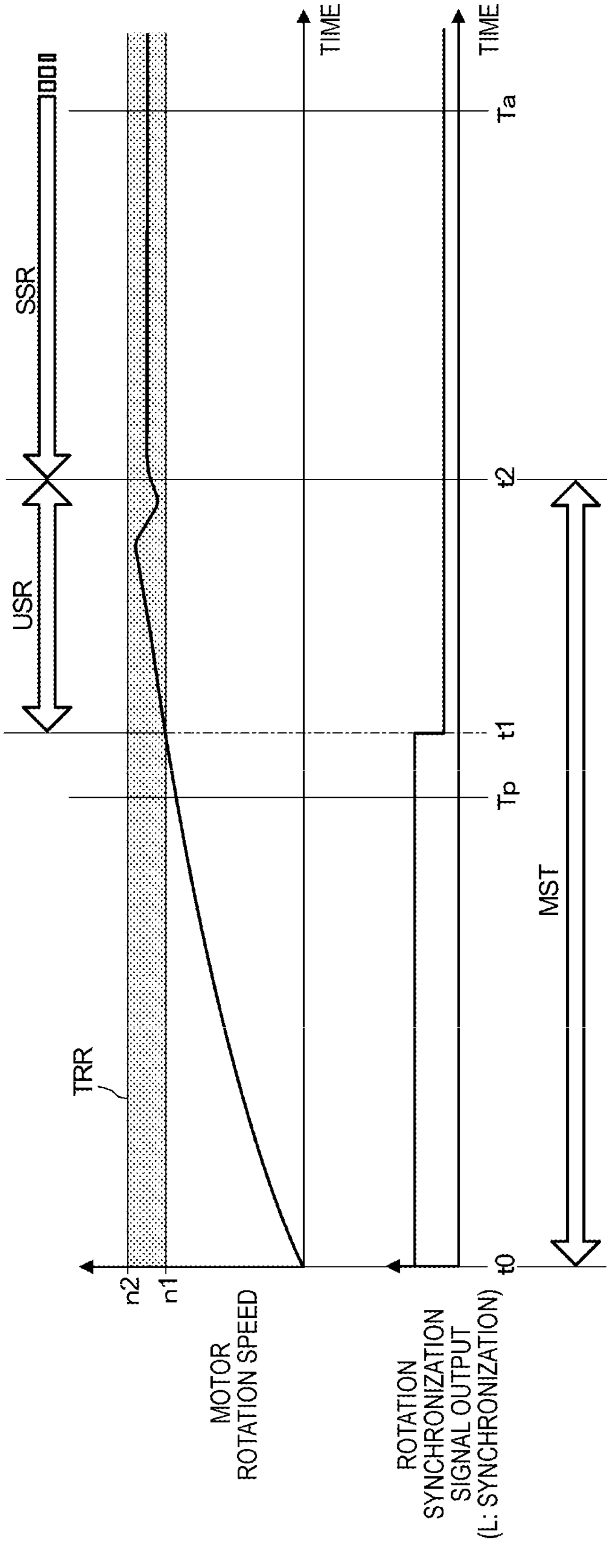
FIG. 11 is a time chart illustrating a relationship between the motor rotation speed and the rotation synchronization signal when the polygon mirror motor is not completely broken but a sign of breakdown is seen.

FIG. 11 is a time chart illustrating a relationship between the motor rotation speed and the rotation synchronization signal when the polygon mirror motor 43*a* is not completely broken but a sign of breakdown is seen. Here, the motor start time MST increases to be longer than that at the normal case. That is, as the motor rotation speed becomes difficult to increase, the motor rotation speed reaches the target rotation speed range TRR, but the initial synchronization signal detection time t1 as the reaching time point is delayed.

Here, in ACT 10, the printer CPU 61 determines that the current synchronization signal detection time t1 exceeds the abnormality possibility determination time Tp. Based on the determination that the abnormality possibility determination time Tp is exceeded (ACT 10, YES), in ACT 14, the printer CPU 61 adds one to the number of times the first period of time is between the second period of time and the third period of time that is being calculated by number counter 643.

In ACT 15, the printer CPU 61 determines whether the number of times calculated by the number counter 643 reaches a defined number of times. The defined number of times is any number of 1 or more. The defined number of times is stored in the non-volatile memory 64 in advance as a setting information value. Based on the determination that the number of times calculated by the number counter 643 does not reach the defined number of times (ACT 15, NO), the printer CPU 61 proceeds to the process operation of ACT 11.

Based on the determination that the number of times calculated by the number counter 643 reaches the defined number of times (ACT 15, YES), in ACT 16, the printer CPU 61 notifies a sign of motor abnormality to the system CPU 51. Next, the printer CPU 61 proceeds to the process operation of ACT 2.

The notification of the sign of motor abnormality includes the history data regarding the first period of time stored in the non-volatile memory 64. The history data regarding the first period of time may be all of the first periods of time corresponding to, for example, the recent 10 times (e.g., the most recent measurement occurrences) stored in the history storage unit 641, the maximum first period of time stored in the maximum time storage unit 642, and the number of times stored in the number counter 643, or may be any one or two thereof. It is preferable that the history data regarding the first period of time includes the number of times stored in the number counter 643.

The system CPU 51 that receives the notification of the sign of motor abnormality causes the display unit 4*a* of the operation panel 4 to display the history data in the notification or to display an alert based on the history data. The user who sees the display can request a maintenance and inspection company for an inspection. The system CPU 51 may transmit the notification of the sign of motor abnormality including the history data or the alert content to the server apparatus 300 via the external interface 56. As a result, the server apparatus 300 can request an inspection of the image forming apparatus 100 to the service person terminal 400.

As described above, when the time t1, that is a period of time in which the rotation speed reaches the target rotation speed range TRR at the start of printing, that is, at the start of rotation of the polygon mirror motor 43*a*, does not reach the abnormality occurrence determination time Ta but the abnormality possibility determination time Tp is passed from the time t1, the printer CPU 61 updates the storage content of the history storage unit 641, optionally updates the storage content of the maximum time storage unit 642, and stores the number of times the situation occurs in the number counter 643.

The content of the history storage unit 641, the maximum time storage unit 642, and/or the number counter 643 is provided from the printer CPU 61 to the system CPU 51 such that the content itself or the alert based on the content is displayed by the display unit 4*a* of the operation panel 4 or the content or the alert content is transmitted to the server apparatus 300.

Accordingly, the user who sees the display or the server apparatus 300 that receives the content can request a repair to the service person while the image forming apparatus 100 is currently usable. As a result, the unusable state of the image forming apparatus 100 caused by complete breakdown of the polygon mirror motor 43*a* can be prevented, or even when breakdown occurs before actually executing a repair, an unusable period until the repair can be reduced.

As described above, in the image forming apparatus 100 according to the embodiment where the polygon mirror 43 rotated by the polygon mirror motor 43*a* deflects a laser beam to the photoconductive drum 30 to form an image, the printer CPU 61 acquires the time t1 that is the initial synchronization signal detection timing and is the first period of time taken until the rotation speed of the polygon mirror motor 43*a* reaches the target rotation speed range TRR. As such, the printer CPU 61 functions as the acquisition unit. The printer CPU 61 determines whether the first period of time is between the abnormality possibility determination time Tp and the abnormality occurrence determination time Ta, the abnormality possibility determination time Tp being the second period of time that is predefined as a period of time in which the rotation speed of the polygon mirror motor 43*a* is in the target rotation speed range TRR, and the abnormality occurrence determination time Ta being the third period of time that is predefined as a period of time required to determine that the polygon mirror motor 43*a* is broken. As such, the printer CPU 61 functions as the determination unit. When the first period of time is between the second period of time and the third period of time, the printer CPU 61 stores the history data regarding the first period of time in, for example, the non-volatile memory 64. As such, the printer CPU 61 and the non-volatile memory 64 function as the storage unit.

As such, in the image forming apparatus 100 according to the embodiment, when the first period of time taken until the rotation speed reaches the target rotation speed range TRR at the start of printing, that is, at the start of rotation of the polygon mirror motor 43*a* does not reach the third period of time or exceeds the second period of time, the printer CPU 61 stores the history data regarding the first period of time in the non-volatile memory 64. Accordingly, by checking the history data, a possibility of abnormality occurrence such as the breakdown of the polygon mirror motor 43*a* can be determined at a time point before polygon mirror motor 43*a* is completely broken. As a result, when there is a possibility of abnormality occurrence, the inspection of the polygon mirror motor 43*a* can be requested, and the unusable state of the image forming apparatus 100 caused by complete breakdown of the polygon mirror motor 43*a* can be prevented, or even when breakdown occurs before actually executing a repair, an unusable period until the repair can be reduced.

Here, the printer CPU 61 causes, for example, the number counter 643 to store, as the history data, a number of times the first period of time is between the second period of time and the third period of time. Accordingly, in the image forming apparatus 100 according to the embodiment, by checking the number of times stored in the number counter 643, the number of times the first period of time is between the second period of time and the third period of time can be determined. Accordingly, depending on the number of times, a possibility of abnormality occurrence such as the breakdown of the polygon mirror motor 43*a* can be determined, and the inspection of the polygon mirror motor 43*a* can be requested.

Alternatively, the printer CPU 61 stores, as the history data, the maximum first period of time until now in, for example, the maximum time storage unit 642. Accordingly, in the image forming apparatus 100 according to the embodiment, by checking the period of time stored in the maximum time storage unit 642, the maximum first period of time until now can be determined. Accordingly, depending on the period of time, a possibility of abnormality occurrence such as the breakdown of the polygon mirror motor 43*a* can be determined, and the inspection of the polygon mirror motor 43*a* can be requested.

Alternatively, the printer CPU 61 stores, as the history data, the first periods of time corresponding to a predetermined number of times, for example, 10 times in order from the latest to the earliest in, for example, the history storage unit 641. Accordingly, in the image forming apparatus 100 according to the embodiment, by checking the plurality of periods of time stored in the history storage unit 641, a change in the first period of time can be determined. Accordingly, depending on a change situation in the first period of time, a possibility of abnormality occurrence such as the breakdown of the polygon mirror motor 43*a* can be determined, and the inspection of the polygon mirror motor 43*a* can be requested.

The first period of time is a time taken until the rotation speed of the polygon mirror motor 43*a* reaches the target rotation speed range TRR. Accordingly, in the image forming apparatus 100 according to the embodiment, a period of time taken until the rotation speed of the polygon mirror motor 43*a* reaches the target rotation speed range TRR from the start of rotation can be determined.

The image forming apparatus 100 according to the embodiment further includes the display unit 4*a* that displays the history data. As such, the display unit 4*a* functions as the display unit. Accordingly, in the image forming apparatus 100 according to the embodiment, by prompting the user to check the history data, whether to request the inspection of the polygon mirror motor 43*a* can be easily determined. The service person who is requested for the inspection can also easily check the history data.

Alternatively, the image forming apparatus 100 according to the embodiment further includes the external interface 56 that transmits the history data to the server apparatus 300 through the external network 600. As such, the external interface 56 functions as the communication unit.

Accordingly, in the image forming apparatus 100 according to the embodiment, by transmitting the history data to the server apparatus 300, a possibility of abnormality occurrence such as the breakdown of the polygon mirror motor 43*a* can be determined in the server apparatus 300 based on the history data.

Hereinabove, one embodiment is described, but the embodiment is not limited thereto. For example, in the embodiment, the first period of time is set as t1 that is the initial synchronization signal detection timing. However, the first period of time may be set as the time t2 where the polygon mirror motor 43*a* enters the steady rotation state after waiting for the rotation speed unstable region USR from the time t1.

In the embodiment, the transmission of the history data to the server apparatus 300 in ACT 1 is executed when the power is input or when a request from the server apparatus 300 is transmitted. However, the history data may not be transmitted when the power is input. Instead, the count value may be transmitted at any differently defined time, for example, the image forming apparatus 100 may be set to start with a timer at a defined time such as at midnight and transmit the count value to the server apparatus 300. The count value may be transmitted under a condition other than the time such as every time the number of times the rotation of the polygon mirror motor 43*a* starts reaches a certain value.

In the embodiment, when the printer CPU 61 determines that the number of times calculated by the number counter 643 in ACT 15 reaches a defined number of times, the sign of motor abnormality is notified in ACT 16. However, two-stage notification may be executed, in which the sign of motor abnormality is notified whenever a sign of breakdown is detected, and an inspection request is notified when the defined number of times is counted. Alternatively, a timing at which the sign of motor abnormality is notified may be determined based on another index such as when the maximum period of time exceeds a fourth period of time set between the second period of time and the third period of time. As the determination condition for notifying the sign of motor abnormality as well, another condition, for example, when the maximum period of time stored in the maximum time storage unit 642 exceeds a defined period of time, may be used instead of the number of times.

In the embodiment, the two processors including the system CPU 51 and the printer CPU 61 are provided. However, of course, each of the process operations of the image forming apparatus 100 may be implemented by one processor.

In the embodiment, the control program is stored in advance in the non-volatile memory 64 of the printer 2 of the image forming apparatus 100. Here, a control program that is transferred independently of the image forming apparatuses may be written into a writable storage device in the image forming apparatus 100 in response to an operation of a manager or the like. The control program or the like can be transferred by storing the control program or the like in a removable computer-readable storage medium or by communication through a network. The form of the computer-readable storage medium is not limited as long as the program can be stored and can be read by the device, for example, a CD-ROM or a memory card.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
- a photoconductor;
- a light source configured to emit a laser beam;
- a polygon mirror configured to deflect the laser beam toward the photoconductor to form an image;
- a polygon mirror motor configured to rotate the polygon mirror; and
- a controller configured to:
  - acquire a measurement of a first spin up time taken for a rotation speed of the polygon mirror motor to reach a target rotation speed range;
  - compare the first spin up time with a first threshold time and a second threshold time, the first threshold time being predefined based on a period of time required for the rotation speed of the polygon mirror motor to reach the target rotation speed range during normal operation, and the second threshold time being predefined based on a period of time indicating that the polygon mirror motor is broken;
  - store history data regarding a plurality of spin up times each corresponding to a different measurement occurrence, the plurality of spin up times including the first spin up time; and
  - provide a notification in response to a determination that both (a) the first spin up time is between the first threshold time and the second threshold time and (b) a number of the spin up times included in the history data that have been between the first threshold time and the second threshold time is more than a predetermined number of times.

2. The image forming apparatus of claim 1, wherein the history data includes a number of occurrences of the spin up times being between the first threshold time and the second threshold time.

3. The image forming apparatus of claim 1, wherein the history data includes a maximum value of the spin up times ever measured for the polygon mirror motor.

4. The image forming apparatus of claim 1, wherein the controller is configured to store up to a predetermined number of spin up times.

5. The image forming apparatus of claim 4, wherein the controller is configured to modify the history data to remove a spin up time corresponding to the oldest measurement occurrence in response to a determination that a new spin up time is measured and the history data already includes the predetermined number of spin up times.

6. The image forming apparatus of claim 1, further comprising a communication interface configured to transmit the history data to a server through a network.

7. The image forming apparatus of claim 1, wherein the notification is a first notification, and wherein the controller is configured to provide a second notification in response to a determination that the first spin up time exceeds the second threshold time.

8. A method comprising:
- receiving a measurement of a first spin up time required for a rotation speed of a polygon mirror motor to reach a target rotation speed range, the polygon mirror motor being configured to rotate a polygon mirror of an image forming apparatus;
- determining whether the first spin up time is between a first threshold time and a second threshold time, the first threshold time being predefined based on a period of time required for the rotation speed of the polygon mirror motor to reach the target rotation speed range during normal operation, and the second threshold time being predefined as a period of time indicating that the polygon mirror motor is broken;
- storing, in a storage device, history data regarding a plurality of spin up times each corresponding to a different measurement occurrence, the plurality of spin up times including the first spin up time; and
- providing a notification in response to a determination that both (a) the first spin up time is between the first threshold time and the second threshold time and (b) a number of the spin up times included in the history data that have been between the first threshold time and the second threshold time is more than a predetermined number of times.

9. The method of claim 8, wherein the history data includes a number of occurrences of the spin up times being between the first threshold time and the second threshold time.

10. The method of claim 8, wherein the history data includes a maximum value of the spin up times ever measured for the polygon mirror motor.

11. The method of claim 8, further comprising modifying the history data to remove a spin up time corresponding to the oldest measurement occurrence in response to a determination that a new spin up time is measured and the history data already includes a predetermined number of spin up times.

12. The method of claim 8, wherein the notification is a first notification, further comprising:

receiving a measurement of a second spin up time; and providing a second notification in response to a determination that the second spin up time exceeds the second threshold time.

13. The method of claim 8, further comprising:

controlling the polygon mirror motor to rotate the polygon mirror within the target rotation speed range; and controlling a light source to emit a laser beam toward the polygon mirror.

14. A non-transitory computer readable medium including instructions stored thereon that, when processed by at least one processor, cause a device to perform operations comprising:

receiving a measurement of a first spin up time required for a rotation speed of a polygon mirror motor to reach a target rotation speed range, the polygon mirror motor being configured to rotate a polygon mirror of an image forming apparatus;

comparing the first spin up time with a first threshold time and a second threshold time, the first threshold time being predefined based on a period of time required for the rotation speed of the polygon mirror motor to reach the target rotation speed range during normal operation, and the second threshold time being predefined based on a period of time indicating that the polygon mirror motor is broken;

storing, in a storage device, history data regarding a plurality of spin up times each corresponding to a different measurement occurrence, the plurality of spin up times including the first spin up time; and providing a notification in response to a determination that both (a) the first spin up time is between the first threshold time and the second threshold time and (b) a number of the spin up times included in the history data that have been between the first threshold time and the second threshold time is more than a predetermined number of times.

* * * * *